United States Patent
Chang et al.

(10) Patent No.: US 11,036,174 B2
(45) Date of Patent: Jun. 15, 2021

(54) WHEEL

(71) Applicant: HP INDIGO B.V., Amstelveen (NL)

(72) Inventors: Seongsik Chang, Palo Alto, CA (US); John Tierney McGarry, San Diego, CA (US); Michael Lee, San Jose, CA (US)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/628,787

(22) PCT Filed: Jul. 13, 2017

(86) PCT No.: PCT/EP2017/067794
§ 371 (c)(1),
(2) Date: Jan. 6, 2020

(87) PCT Pub. No.: WO2019/011440
PCT Pub. Date: Jan. 17, 2019

(65) Prior Publication Data
US 2020/0125024 A1   Apr. 23, 2020

(51) Int. Cl.
*G03G 15/00* (2006.01)
*F16H 55/32* (2006.01)

(52) U.S. Cl.
CPC ........... *G03G 15/757* (2013.01); *F16H 55/32* (2013.01)

(58) Field of Classification Search
CPC .. F16H 55/32; G03G 15/025; G03G 15/0266; G03G 15/0275; G03G 21/1814; G03G 21/1821; G03G 15/0813
See application file for complete search history.

(56) References Cited

U.S. PATENT DOCUMENTS

| | | |
|---|---|---|
| 5,339,132 A | 8/1994 | Tomita et al. |
| 5,666,608 A | 9/1997 | Christensen |
| 5,790,927 A | 8/1998 | Ando et al. |
| 6,035,163 A | 3/2000 | Zona et al. |
| 7,668,483 B2 | 2/2010 | Kamoshida et al. |
| 2003/0180071 A1 | 9/2003 | Suda |
| 2004/0109706 A1* | 6/2004 | Kosuge ................ G03G 15/025 399/168 |
| 2005/0175374 A1* | 8/2005 | Kosuge ................ G03G 15/025 399/168 |
| 2006/0170935 A1* | 8/2006 | Mukai ................. G03G 15/025 358/1.1 |
| 2006/0188293 A1* | 8/2006 | Narita ................. G03G 15/025 399/176 |
| 2007/0092298 A1* | 4/2007 | Kamoshida .......... G03G 15/025 399/168 |
| 2014/0205322 A1 | 7/2014 | Watanabe et al. |
| 2019/0018363 A1* | 1/2019 | Yamaguchi ........ G03G 21/1821 |

FOREIGN PATENT DOCUMENTS

| | | |
|---|---|---|
| JP | 3408082 | 5/2003 |
| JP | 2007128113 | 5/2007 |

* cited by examiner

*Primary Examiner* — Sevan A Aydin
(74) *Attorney, Agent, or Firm* — HP Inc. Patent Department

(57) ABSTRACT

In one example, a wheel includes an annular body having a central axis; and multiple concentric grooves in the body surrounding the central axis. A first one of the grooves penetrates the body from a first side and a second one of the grooves penetrates the body from a second side opposite the first side.

4 Claims, 5 Drawing Sheets

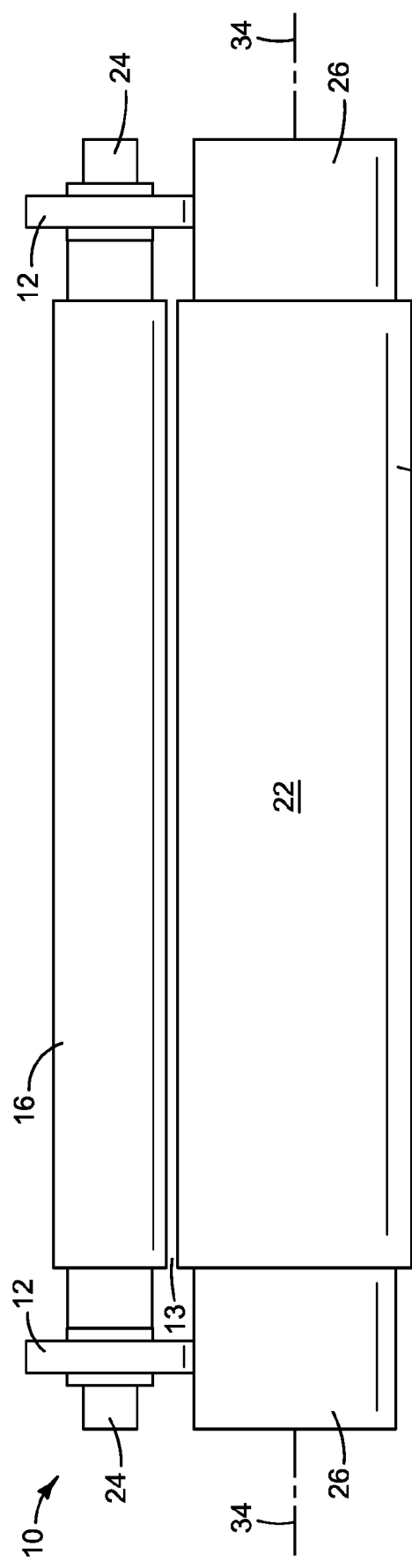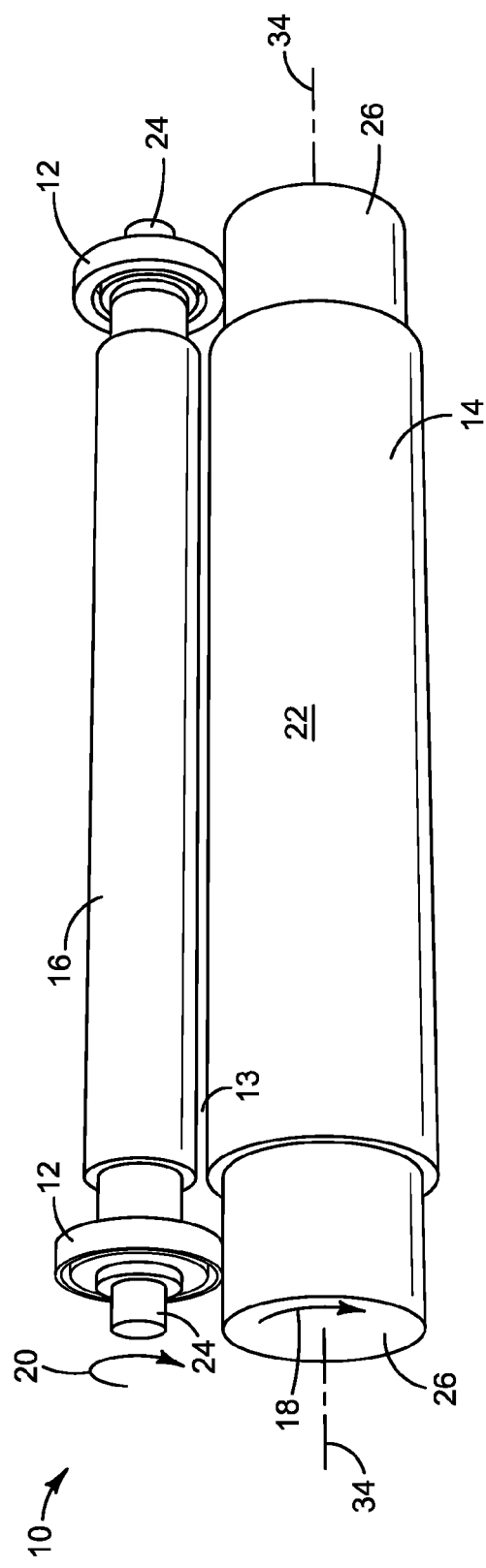

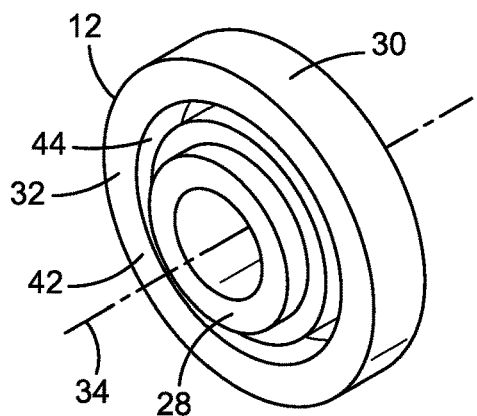
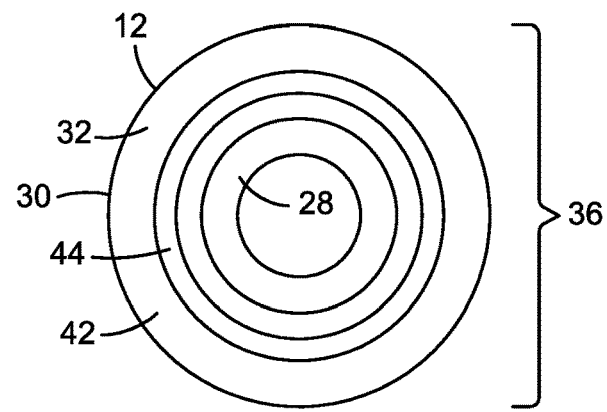
FIG. 3　　　　FIG. 4
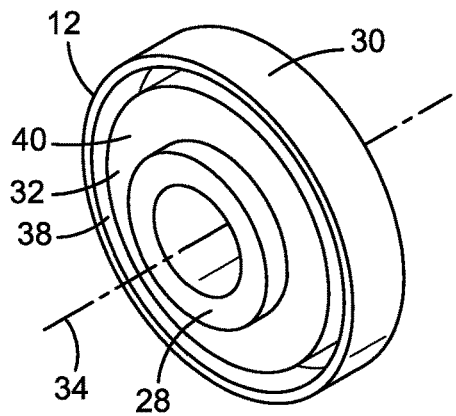
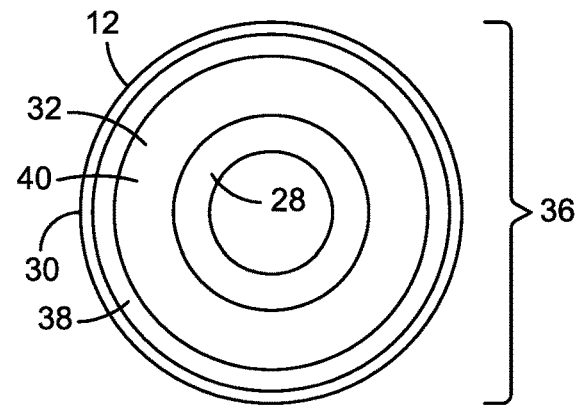
FIG. 5　　　　FIG. 6
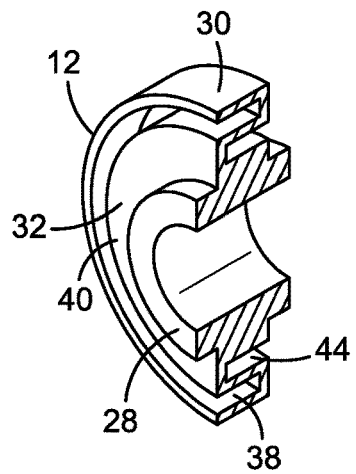
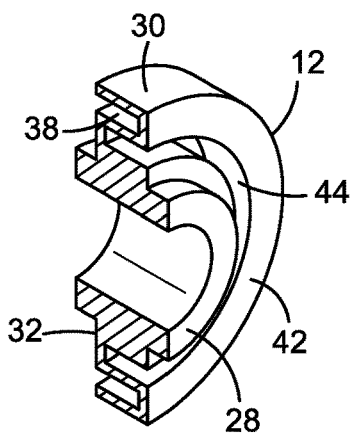
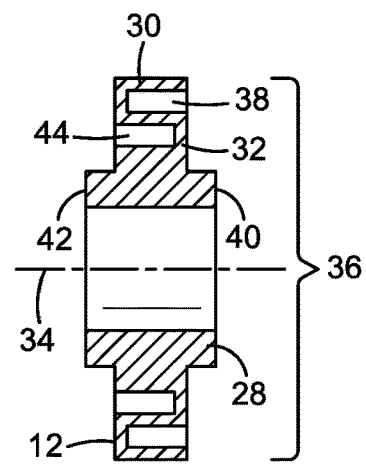
FIG. 7　　FIG. 8　　FIG. 9

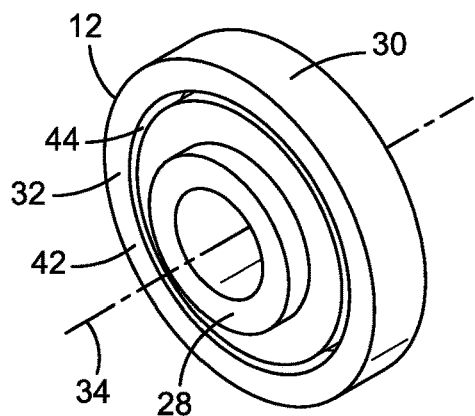
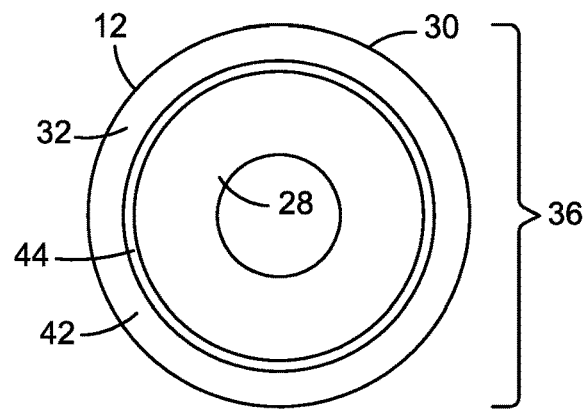
FIG. 11  FIG. 12
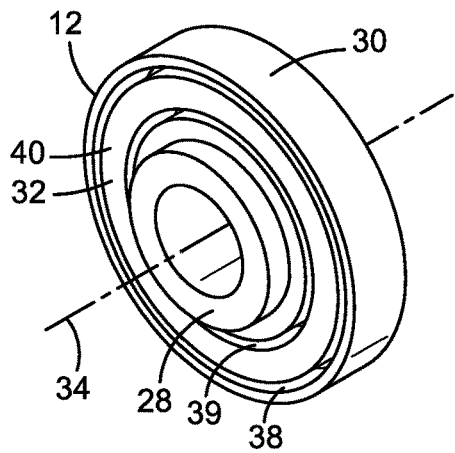
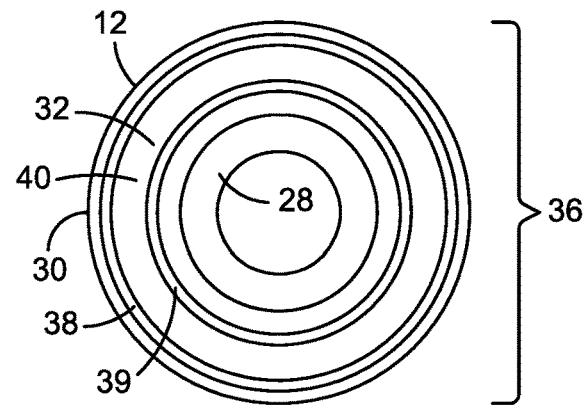
FIG. 13  FIG. 14
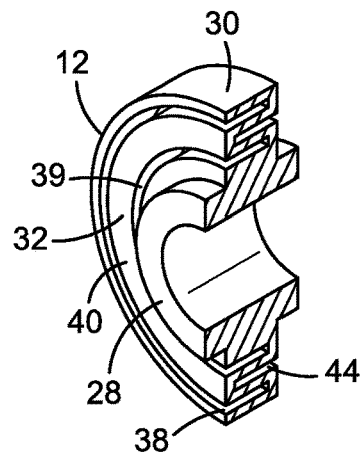
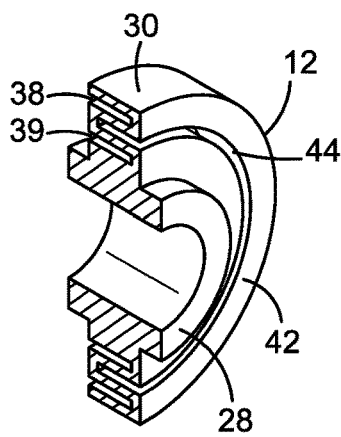
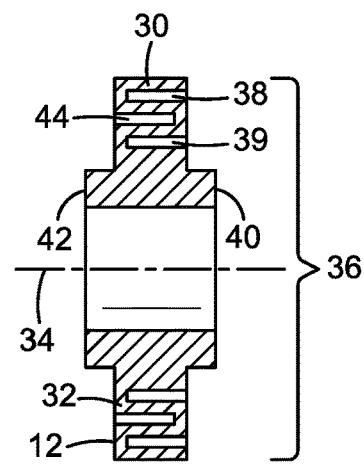
FIG. 15  FIG. 16  FIG. 17

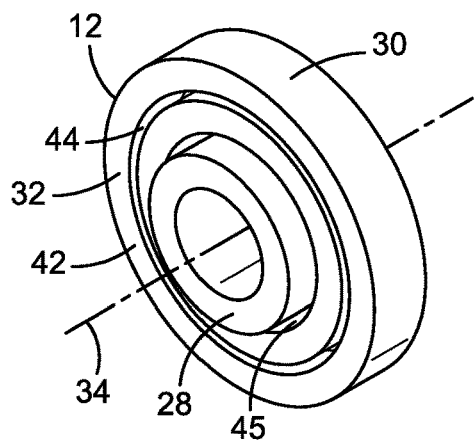 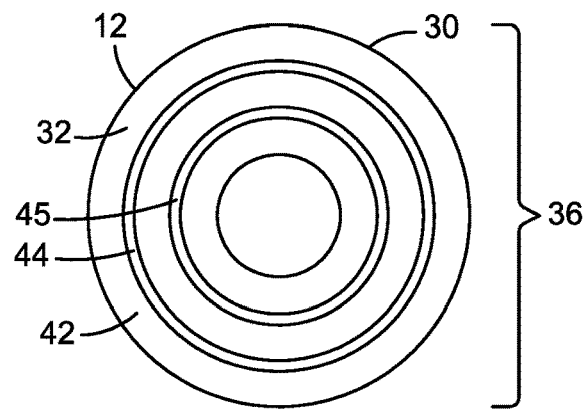
FIG. 18  FIG. 19
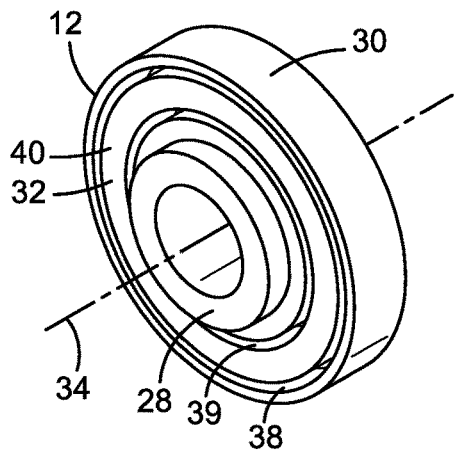 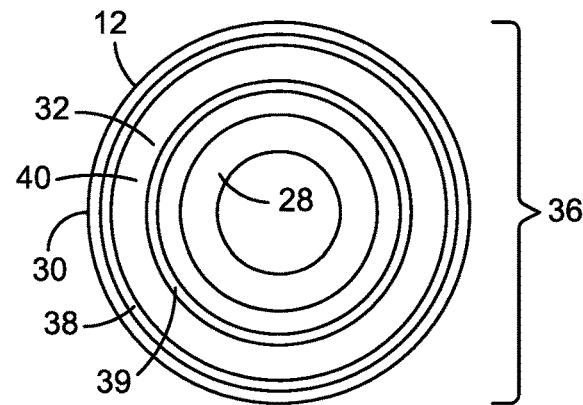
FIG. 20  FIG. 21
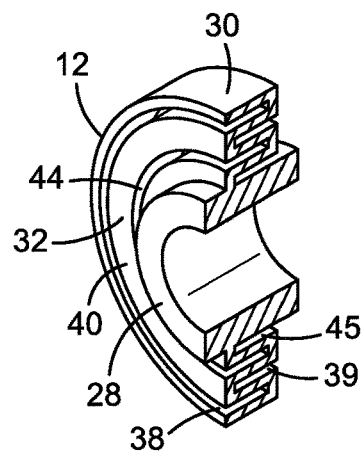 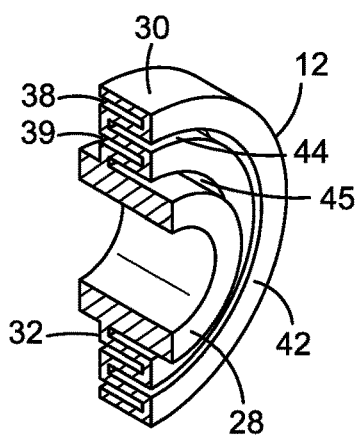 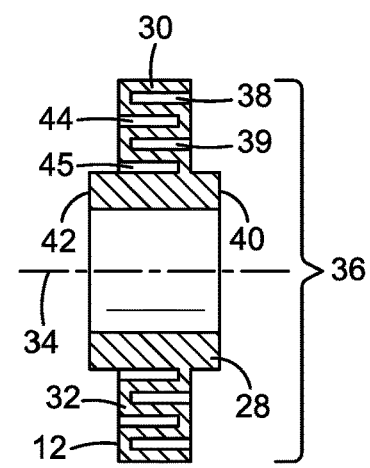
FIG. 22  FIG. 23  FIG. 24

WHEEL

BACKGROUND

Liquid electro-photographic (LEP) printing uses a special kind of ink to form images on paper and other print substrates. LEP inks include toner particles dispersed in a carrier liquid. Accordingly, LEP ink is sometimes called liquid toner. In LEP printing processes, an electrostatic pattern of the desired printed image is formed on a photoconductor. This latent image is developed into a visible image by applying a thin layer of LEP ink to the patterned photoconductor. Charged toner particles in the ink adhere to the electrostatic pattern on the photoconductor. The liquid ink image is transferred from the photoconductor to an intermediate transfer member (ITM) that is heated to transform the liquid ink to a molten toner layer that is then pressed on to the print substrate.

DRAWINGS

FIGS. 1 and 2 are elevation and isometric views illustrating a device implementing one example of a friction wheel to transmit motion between adjacent rollers.

FIGS. 3-9 are detail views of the example friction wheel shown in FIGS. 1 and 2. FIGS. 3 and 4 are isometric and elevation views showing one side of the wheel. FIGS. 5 and 6 are isometric and elevation views showing the other side of the wheel. FIGS. 7-9 are section views of the wheel from different view angles.

FIGS. 11-17 are detail views illustrating another example of a friction wheel, such as might be used in a device like that shown in FIGS. 1 and 2. FIGS. 11 and 12 are isometric and elevation views showing one side of the wheel.

FIGS. 13 and 14 are isometric and elevation views showing the other side of the wheel. FIGS. 15-17 are section views of the wheel from different view angles.

FIGS. 18-24 are detail views illustrating another example of a friction wheel, such as might be used in a device like that shown in FIGS. 1 and 2. FIGS. 18 and 19 are isometric and elevation views showing one side of the wheel.

FIGS. 20 and 21 are isometric and elevation views showing the other side of the wheel. FIGS. 22-24 are section views of the wheel from different view angles.

The same part numbers designate the same or similar parts throughout the figures. The figures are not necessarily to scale.

DESCRIPTION

Figure 10:
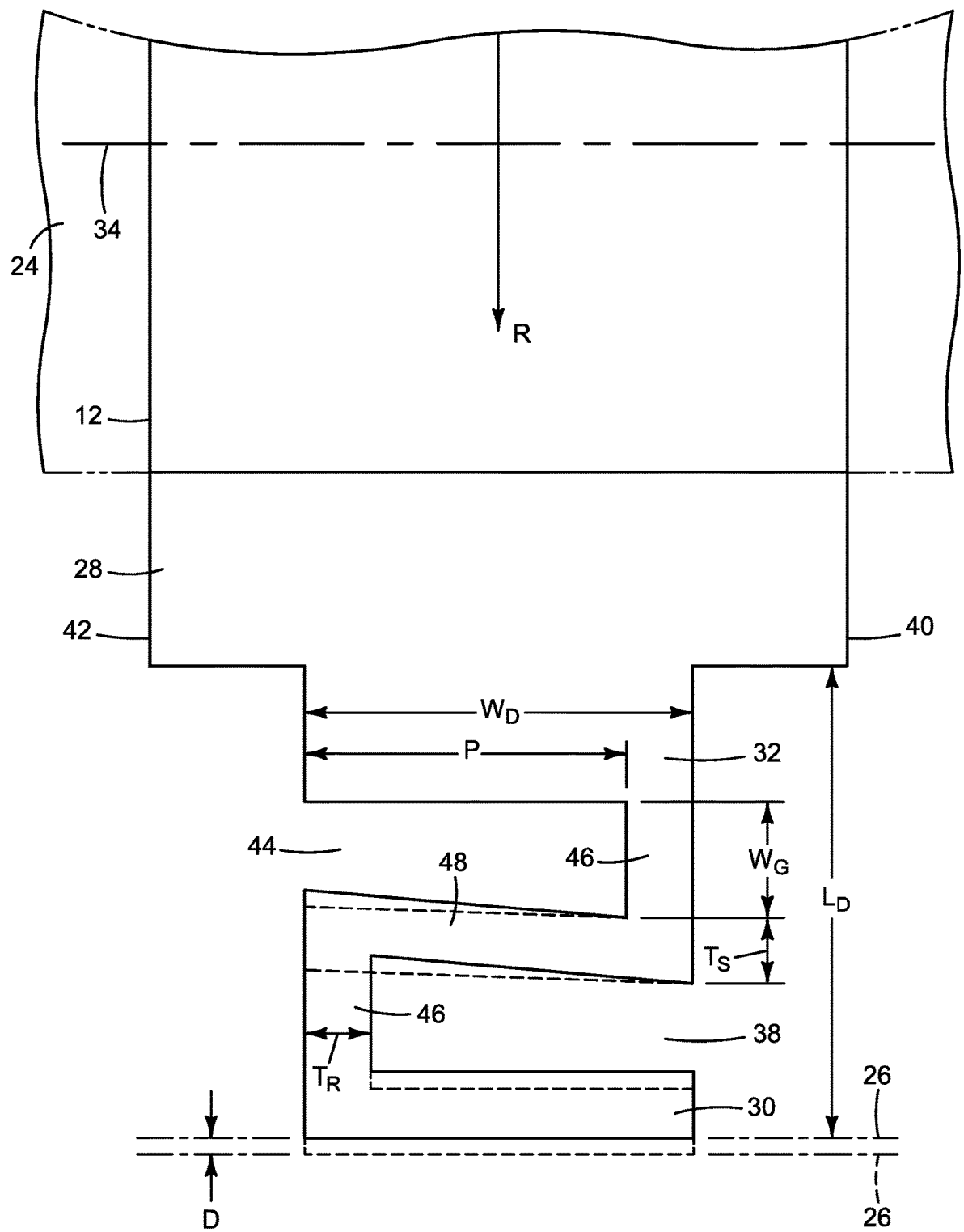
FIG. 10 is another detail illustrating compression and decompression of the example wheel shown in FIGS. 1-9.

In some LEP printing processes, the photoconductor is implemented as a photoconductive surface on the outside of a larger diameter roller, sometimes referred to as a photoconductor "drum." A charge roller is used to place a uniform charge on the photoconductive surface, before the surface is patterned for the desired printed image. As the two rollers rotate, the surfaces of the photoconductor roller and the charge roller pass very close to one another across a small gap. The gap is maintained by a friction wheel at each end of the charge roller. Each friction wheel bears against the photoconductor roller. The friction wheels function as rolling spacers to maintain the gap between the two rollers and as drivers to transmit the rotary motion of the photoconductor roller to the charge roller. The photoconductor roller sometimes drops suddenly away from the charge roller due to a reduction in upward force on the photoconductor roller each time the seam on the intermediate transfer roller meets the impression cylinder. The charge roller can vibrate in response to the short sudden drops of the photoconductor roller, upsetting the balance of forces between the photoconductor roller and the charge roller and causing the charge roller to free fall and releasing bending energy into vibration. Longer charge rollers are more likely to vibrate compared to shorter charge rollers.

A new friction wheel has been developed to help prevent the charge roller from vibrating in response to sudden drops in the photoconductor roller. A friction wheel includes a hub, a rim, and a disc connecting the hub and the rim. Multiple annular grooves penetrate the disc axially from one side partially through the disc toward the other side. In one example, each groove penetrates the disc from the side opposite that of the adjacent groove(s). The grooves allow the disc to flex in response to changes in forces on the rim. If the disc is compressed during normal operation, then when the photoconductor roller drops, the disc decompresses to help maintain the vertical position of the charge roller and avoid a drop that can cause vibration. The number, width and depth of the groove(s) as well as wall thickness and spacing between grooves may be varied to achieve the desired compression and flexibility, to help isolate the charge roller from any sudden drop of the photoconductor roller.

Although examples are described with reference to friction wheels for a charge roller in an electrophotographic printer, examples are not limited to charge rollers or printers or even friction wheels, but may be implemented in other applications and in other machines. While it is expected that examples of the new wheel usually will be implemented as a friction wheel for turning one shaft at the urging of another shaft, it may be that in some implementations the wheel functions as a rolling spacer without also transmitting rotation from one shaft to another. The examples shown in the figures and described herein illustrate but do not limit the scope of the patent, which is defined in the Claims following this Description.

FIGS. 1 and 2 illustrate a device 10 implementing one example of friction wheels 12 operatively connecting rollers 14 and 16 so that rotating one roller in one direction causes the other roller to rotate in the opposite direction, as indicated by rotation arrows 18 and 20 in FIG. 2. Friction wheels 12 also maintain a gap 13 between adjacent rollers 14 and 16. In an electrophotographic printer, for example, roller 14 represents a photoconductor roller with a photoconductive surface 22 and roller 16 represents a charge roller. Photoconductor roller 14 is driven independently of charge roller 16. Thus, photoconductor roller 14 drives charge roller 16 through friction wheels 12. Friction wheels 12 are pressed on or otherwise affixed to a shaft 24 on opposite ends of roller 16 so that shaft 24 and thus roller 16 turns with wheels 12. Frictions wheels 12 engage a shaft 26 at each end of photoconductor roller 14. The relative size of a photoconductor roller 14 and a charging 16 in FIGS. 1 and 2 may be greatly exaggerated compared to an actual implementation. For example, in an LEP printer the diameter of a photoconductor "drum" 14 may be many times greater than the diameter of the charging roller 16.

FIGS. 3-9 are detail views of one of example of a wheel 12, such as may be implemented as friction wheels 12 shown in FIGS. 1 and 2. Referring now also to FIGS. 3-9, wheel 12 includes a hub 28, a rim 30, and a disc 32. Wheel 12 rotates about an axis 34. Hub 28, rim 30 and disc 32 collectively form an annular body 36 having a central axis 34. A first, outer annular groove 38 penetrates disc 32 axially from a first side 40 partially through the disc toward a second side 42. A second, inner annular groove 44 penetrates disc 32 axially from second side 42 partially through the disc toward first side 40. Thus, concentric grooves 38, 44 penetrate disc 32 from opposite sides.

As shown in the detail of FIG. 10, grooves 38, 44 allow disc 32 to compress and decompress radially (direction R in FIG. 10). In FIG. 10, a more compressed position is depicted with solid lines and a less compressed position is depicted with dashed lines. (Roller shafts 24 and 26 are depicted with phantom lines in FIG. 10.) Disc 32 may flex or bend along the root 46 of each groove 38, 44 and along the wall 48 separating grooves 38, 44 to compress and decompress. Rim 30 moves a distance D radially between compressed and decompressed the positions, for example during normal loading in which the disc is more compressed (solid lines) and in reaction to a sudden drop of a photoconductor roller shaft 26, during which the disc decompresses (dashed lines) to help prevent a corresponding drop of a charge roller shaft 24.

FIGS. 11-17 are detail views illustrating another example of a wheel 12, such as might be used in a device like device 10 shown in FIGS. 1 and 2. Referring to FIGS. 11-17, in this example wheel 12 includes three concentric annular grooves 38, 39 and 44. Each groove 38, 39, 44 penetrates disc 32 alternately from one side 40 and then the other side 42.

FIGS. 18-24 are detail views illustrating another example of a wheel 12, such as might be used in a device like device 10 shown in FIGS. 1 and 2. Referring to FIGS. 18-24, in this example wheel 12 includes four concentric annular grooves 38, 39, 44 and 45. Each groove 38, 39, 44, 45 penetrates disc 32 alternately from one side 40 and then the other side 42.

Referring again to FIGS. 1 and 2, in one example for a device 10 for electrophotographic printing, the desired gap 13 between photoconductor roller 14 and charge roller 16 is 45 µm and photoconductor roller 14 drops periodically about 10 µm within 1 ms. The grooves in wheel disc 32 are configured to provide enough compression to absorb the 10 µm drop without a corresponding drop of charge roller 16. Referring now also to FIG. 10, for a solid plastic PEEK (polyether ether ketone) wheel 12 with a disc 32 that is 13 mm radially from hub to rim ($L_D$) and 10 mm wide axially ($W_D$), simulations for various groove geometries indicate that 2-4 concentric grooves each having a root wall thickness $T_R$ of 1 mm to 1.5 mm, a separating wall thickness Ts of 1 mm to 2.0 mm, and a cumulative groove width (e.g., $W_G \times 2$ in FIG. 10) of 6.0 mm evenly distributed among the grooves, will deliver at least 50 µm of decompression without losing effective pressure against the photoconductor roller, significantly reducing or eliminating charge roller drop and consequent vibration caused by a sudden drop of the photoconductor roller. ($T_R$ is the difference between the axial width $W_D$ of disc 32 and the depth of penetration P of each groove 38, 44.)

The examples shown in the figures and described above illustrate but do not limit the patent, which is defined in the following Claims.

"A", "an" and "the" used in the claims means one or more.

The invention claimed is:

1. A device for an electrophotographic printer, comprising:
    a first roller having a photoconductive surface and a rotatable first shaft connected to the photoconductive surface such that the photoconductive surface turns with the first shaft;
    a second roller to place a uniform charge on the photoconductive surface, the second roller having a rotatable second shaft oriented parallel to the first shaft; and
    a friction wheel having:
    a hub mounted to the second shaft such that the second shaft turns with the friction wheel;
    a rim in rolling engagement with the first shaft such that the friction wheel turns with the first shaft; and
    a disc connecting the rim to the hub, the disc having multiple concentric annular grooves therein penetrating the disc axially from a first side of the disc toward a second side of the disc opposite the first side.

2. The wheel of claim 1, where the concentric annular grooves penetrate the body alternately from the first side and then the second side.

3. The wheel of claim 1, where the grooves are to decompress radially at least 50 µm.

4. The wheel of claim 3, where:
    a root at the end of each groove is 1.0 mm to 1.5 mm thick measured axially; and
    each wall separating one groove from another groove is 1.0 mm to 2.0 mm thick measured radially.

* * * * *